(12) United States Patent
Gates et al.

(10) Patent No.: US 9,261,236 B2
(45) Date of Patent: Feb. 16, 2016

(54) TRAIN PROPELLANT MANAGEMENT SYSTEMS AND METHODS

(71) Applicant: Elwha LLC, Bellevue, WA (US)

(72) Inventors: William Gates, Redmond, WA (US); Roderick A. Hyde, Redmond, WA (US); Jordin T. Kare, Seattle, WA (US); Nathan P. Myhrvold, Bellevue, WA (US); Tony S. Pan, Cambridge, MA (US); Nels R. Peterson, Bellevue, WA (US); Clarence T. Tegreene, Mercer Island, WA (US); Lowell L. Wood, Jr., Bellevue, WA (US)

(73) Assignee: Elwha LLC, Bellevue, WA (US)

(*) Notice: Subject to any disclaimer, the term of this patent is extended or adjusted under 35 U.S.C. 154(b) by 0 days.

(21) Appl. No.: 14/069,095

(22) Filed: Oct. 31, 2013

(65) Prior Publication Data

US 2015/0114009 A1    Apr. 30, 2015

(51) Int. Cl.
F17C 7/02     (2006.01)
F17C 9/02     (2006.01)
G06Q 10/00    (2012.01)
F17C 1/00     (2006.01)
G06Q 10/06    (2012.01)

(52) U.S. Cl.
CPC ............ F17C 1/00 (2013.01); G06Q 10/06316 (2013.01)

(58) Field of Classification Search
CPC ................. G06Q 10/06316; G06Q 10/06315; G06Q 10/08
USPC ............. 62/50.1; 705/7.11–7.27, 8, 332–341
See application file for complete search history.

(56) References Cited

U.S. PATENT DOCUMENTS

| | | | |
|---|---|---|---|
| 4,359,118 A | 11/1982 | Latter et al. | |
| 5,121,609 A | 6/1992 | Cieslukowski | |
| 5,228,295 A | 7/1993 | Gustafson | |
| 5,231,838 A | 8/1993 | Cieslukowski | |
| 5,441,234 A * | 8/1995 | White et al. | 251/144 |
| 5,505,232 A | 4/1996 | Barclay | |
| 5,566,712 A | 10/1996 | White et al. | |
| 5,887,567 A | 3/1999 | White et al. | |
| 6,047,747 A | 4/2000 | Bowen et al. | |
| 8,065,883 B2 | 11/2011 | Pozivil | |
| 8,959,931 B2 * | 2/2015 | Mathews et al. | 62/50.2 |
| 2007/0068176 A1 | 3/2007 | Pozivil | |
| 2007/0214031 A1 * | 9/2007 | Amano | 705/8 |
| 2008/0071596 A1 | 3/2008 | Smith | |
| 2008/0294484 A1 * | 11/2008 | Furman et al. | 705/8 |
| 2009/0187450 A1 * | 7/2009 | Kocis et al. | 705/8 |
| 2010/0088142 A1 * | 4/2010 | El-Bakry et al. | 705/8 |
| 2013/0006886 A1 * | 1/2013 | Estes et al. | 705/332 |

FOREIGN PATENT DOCUMENTS

WO    WO 2013085690 A1 *  6/2013  ............. G06Q 10/00

* cited by examiner

Primary Examiner — Allen Flanigan
Assistant Examiner — Filip Zec
(74) Attorney, Agent, or Firm — Foley & Lardner LLP

(57) ABSTRACT

An LNG storage and delivery method for a transportation system includes routing a first train to scheduled stops along a first train route, routing the first train to an LNG fuel source positioned on the first train route, transferring LNG from the LNG fuel source to the first train, and transporting LNG from the LNG fuel source to an LNG storage site positioned along a second train route using the first train.

19 Claims, 7 Drawing Sheets

TRAIN PROPELLANT MANAGEMENT SYSTEMS AND METHODS

CROSS-REFERENCE TO RELATED PATENT APPLICATIONS

This application is related to U.S. application Ser. No. 13/625,607, filed Sep. 24, 2012, titled "System and Method for Storing and Dispensing Fuel and Ballast Fluid"; U.S. application Ser. No. 13/625,715, filed Sep. 24, 2012, titled "System and Method for Storing and Dispensing Fuel and Ballast Fluid"; U.S. application Ser. No. 13/957,077, filed Aug. 1, 2013, titled "Systems, Methods, and Apparatuses Related to Vehicles with Reduced Emissions"; and U.S. application Ser. No. 13/957,083, filed Aug. 1, 2013, titled "Systems, Methods, and Apparatuses Related to Vehicles with Reduced Emission," all of which are incorporated herein by reference in their entireties.

BACKGROUND

Natural gas is sometimes used as a fuel source for trains. Natural gas can be an attractive alternative to diesel fuel because it can be less expensive to produce and procure, and produces less carbon dioxide when burned. Natural gas is readily available as a fossil fuel, and can also be produced from waste at man-made facilities. However, in many areas of the world, including in the United States, the natural gas infrastructure (e.g. natural gas facilities, storage sites, pipelines, etc.) is not as developed as the infrastructure for diesel fuel. Also, natural gas can be challenging to store and/or transport long distances, reducing the benefit of using natural gas as a fuel source.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

An embodiment of the present disclosure relates to an LNG storage and delivery method for a transportation system. The method includes routing a first train to scheduled stops along a first train route, routing the first train to an LNG fuel source positioned on the first train route, transferring LNG from the LNG fuel source to the first train, and transporting LNG from the LNG fuel source to an LNG storage site positioned along a second train route using the first train.

Another embodiment of the present disclosure relates to a fuel management system. The fuel management system includes an LNG fuel source, an LNG storage site configured to receive and store LNG, a first train having a first train route for receiving LNG from the LNG fuel source and delivering the LNG to the LNG storage site, and a second train having a second train route for receiving the LNG from the LNG storage site and using the LNG to fuel the second train. The LNG fuel source is positioned along the first train route, and the LNG storage site is positioned along both the first and second train routes.

Another embodiment of the present disclosure relates to a thermal ballasting method. The method includes providing a first train having a first LNG, routing the first train to scheduled stops along a first train route, forming a first ballast cryogen by condensing a first atmospheric gas to produce a first latent heat within the first train, transferring the first latent heat to the first LNG, evaporating the first LNG to form a first natural gas, consuming the first natural gas to fuel the first train, and delivering the first ballast cryogen to an LNG storage site positioned along the first train route.

Another embodiment of the present disclosure relates to a fuel management system for a train. The fuel management system includes a first train having a first train route. The first train includes a first LNG, and a first ballast cryogen formed by condensing a first atmospheric gas. The system also includes an LNG storage site positioned along the first train route. The first ballast cryogen provides a first latent heat for evaporating the first LNG, forming a first natural gas. The first train is fueled by the first natural gas, and the first train is configured to deliver the first ballast cryogen to the LNG storage site.

Another embodiment of the present disclosure relates to a propellant management method. The propellant management method includes providing a first train having a first natural gas clathrate, the first natural gas clathrate comprising a first natural gas and a host material, routing the first train to scheduled stops along a first train route, removing the first natural gas from the first natural gas clathrate within the first train, forming a first recovered host material, consuming the first natural gas to fuel the first train, producing carbon dioxide, combining at least some of the carbon dioxide with the first recovered host material, forming a carbon dioxide clathrate, delivering the carbon dioxide clathrate to a fuel storage area positioned along the first train route, removing at least some of the carbon dioxide from the carbon dioxide clathrate within the fuel storage area, forming a second recovered host material, receiving a second natural gas within the fuel storage area, and combining the second natural gas with at least some of the second recovered host material, forming a second natural gas clathrate.

Another embodiment of the present disclosure relates to an LNG delivery method for a transportation system. The method includes routing a train to an LNG fuel source positioned on a train route, transferring LNG from the LNG fuel source to the train, and transporting the LNG to an LNG storage site positioned along a truck route using the train.

DETAILED DESCRIPTION

Figure 1:
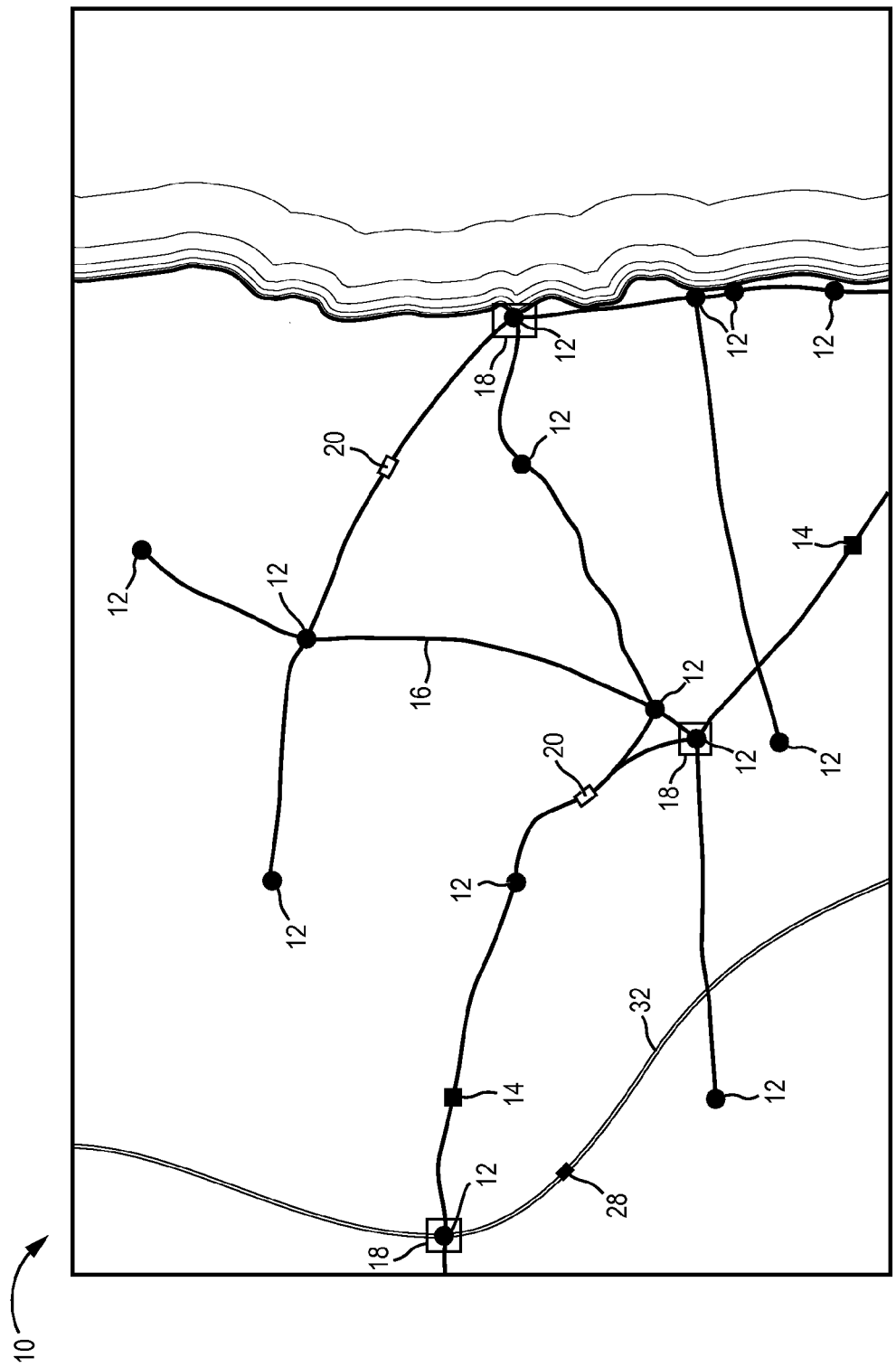
FIG. 1 is a rail map for a train propellant management system, according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to FIG. 1, rail map 10 for a train propellant management system is shown. Rail map 10 is a visual representation of a train propellant management system, according to one embodiment. In this embodiment, the train propellant management system includes train stations 12 connected by rail lines 16 (e.g., tracks, etc.). Train stations 12 may be located according to proximity to a major city, proximity to fuel resources, or according to another factor suitable for the application. The train propellant management system also includes trains such as train 20. Rail lines 16 are positioned to allow train 20 to move efficiently between train stations 12.

The train propellant management system may also include one or more fuel sources (e.g. liquefaction facility, natural gas pipeline, LNG production facility, etc.), shown as fuel production sites 14 in FIG. 1, located along rail lines 16. In some embodiments, fuel production sites 14 are located according to proximity to sources of fuel. In the illustrated embodiment of FIG. 1, train 20 has a specified route, and may be routed to fuel production sites 14 according to rail map 10. Train 20 may obtain fuel from fuel production sites 14 in order to power locomotive 42 (shown in FIG. 2) of train 20. In some embodiments, train 20 is routed in order to pass fuel production sites 14 often enough to maintain a specified fuel level of train 20 (e.g. a level sufficient for maintaining the operational function of train 20). The specified fuel level may be related to the percentage of natural gas boil-off at fuel storage area 18 (i.e. amount which is evaporated) which can be economically tolerated by the train propellant management system. The specified fuel level may also be related to a fixed time interval determined by the train propellant management system.

Train 20 may also be routed to fuel production sites 14 en route to one or more train stations 12 in order to obtain fuel for train 20 and for other trains. According to one embodiment, fuel production sites 14 contain a storage of liquefied natural gas (LNG) used to fuel trains within the train propellant management system. In some embodiments, the LNG is produced by thermal ballasting (i.e. application of low-temperature material in order to change the physical state of another material). As used herein, natural gas, or liquefied natural gas, comprises methane, either alone or in the presence of lesser amounts of other constituents. In one embodiment, train 20 may include a train car configured to store LNG, such as fuel storage car 40 (shown in FIG. 3). Fuel storage car 40 may be coupled to locomotive 42, and transported along with the other cars of train 20 to other train stations 12 located on rail map 10. Fuel storage car 40 may be filled with LNG, and the LNG may be used to fill a stationary fuel container such as fuel storage tank 50 (shown in FIG. 4). Fuel storage car 40 may also be removed and stored at train station 12 for another train to use as a source of fuel. In some embodiments, train 20 is not be fueled by LNG, but train 20 is used to deliver LNG to other LNG-fueled trains within the train propellant management system. In other embodiments, train 20 is fueled by LNG and is filled with LNG at fuel production sites 14 or fuel storage areas 18.

The train propellant management system may also include one or more fuel storage sites (e.g. LNG storage sites, etc.), shown in FIG. 1 as fuel storage areas 18. In the illustrated embodiment of FIG. 1, fuel storage areas 18 are located proximate train stations 12. In various embodiments, fuel storage areas 18 are located at intersections of one or more train routes. Fuel storage areas 18 are configured to store fuel for trains routed according to rail map 10, such as train 20. In one embodiment, fuel storage area 18 includes a natural gas liquefaction facility. The train propellant management system is intended to allow the trains to be fueled from a relatively small number of fuel storage areas 18 and fuel production sites 14. Fuel storage areas 18 are chosen to allow minimal deviation from the specified routes for the train delivering fuel and the train receiving fuel. In some embodiments, fuel storage areas 18 are located based on geographical variations in natural gas pricing (e.g. located close to fuel production sites 14 having relatively lower prices). In some embodiments, fuel storage areas 18 include one or more fuel storage tanks 50 located within or substantially adjacent to fuel storage areas 18. In other embodiments, fuel storage areas 18 include one or more portable fuel storage cars 40 for carrying fuel positioned within or substantially adjacent to fuel storage areas 18. In still other embodiments, fuel storage areas 18 may include another type of fuel container suitable for the particular application or use, or another source of fuel or train propellant suitable for the particular application of the system. The routing of train 20 to fuel storage area 18 may be based upon the amount of LNG already stored at fuel storage area 18, upon its LNG storage capacity, or upon fuel needs of other trains supplied from fuel storage area 18.

In some embodiments, train 20 is routed between train stations 12, fuel production sites 14, and fuel storage areas 18 according to rail map 10, and in order to maintain the specified fuel level. In other embodiments, train 20 may be routed according to another goal or purpose. For instance, train 20 may be routed in order to maximize the fuel efficiency of train 20 and/or the train propellant management system, or to minimize the cost (e.g., an LNG cost) of the train propellant management system. For instance, the arrival scheduling of two trains (e.g., train 20 supplying LNG and a second train receiving LNG) at fuel storage area 18 can be coordinated, perhaps basing the planned arrival time of one of the trains on the actual or predicted arrival time of the other train.

In some embodiments, the train propellant management system includes automobiles fueled by LNG, such as trucks 28. In these embodiments, trains 20 may be routed to fuel production sites 14 (or another fuel source) to obtain LNG, carrying the LNG along a train route and depositing the LNG at fuel storage areas 18 located or positioned at one or more intersections of rail lines 16 and highways 32 (e.g., roads, etc.). Trucks 28 fueled by LNG may be routed (as part of a truck route) to fuel storage areas 18 located along highway 32 in order to re-fuel with LNG from fuel storage areas 18. Trucks 28 may also include a storage tank or other receptacle (e.g., container 62, fuel storage tank 50, etc.) for filling with LNG to transport to other fuel storage areas 18 located along the truck route.

Figure 2:
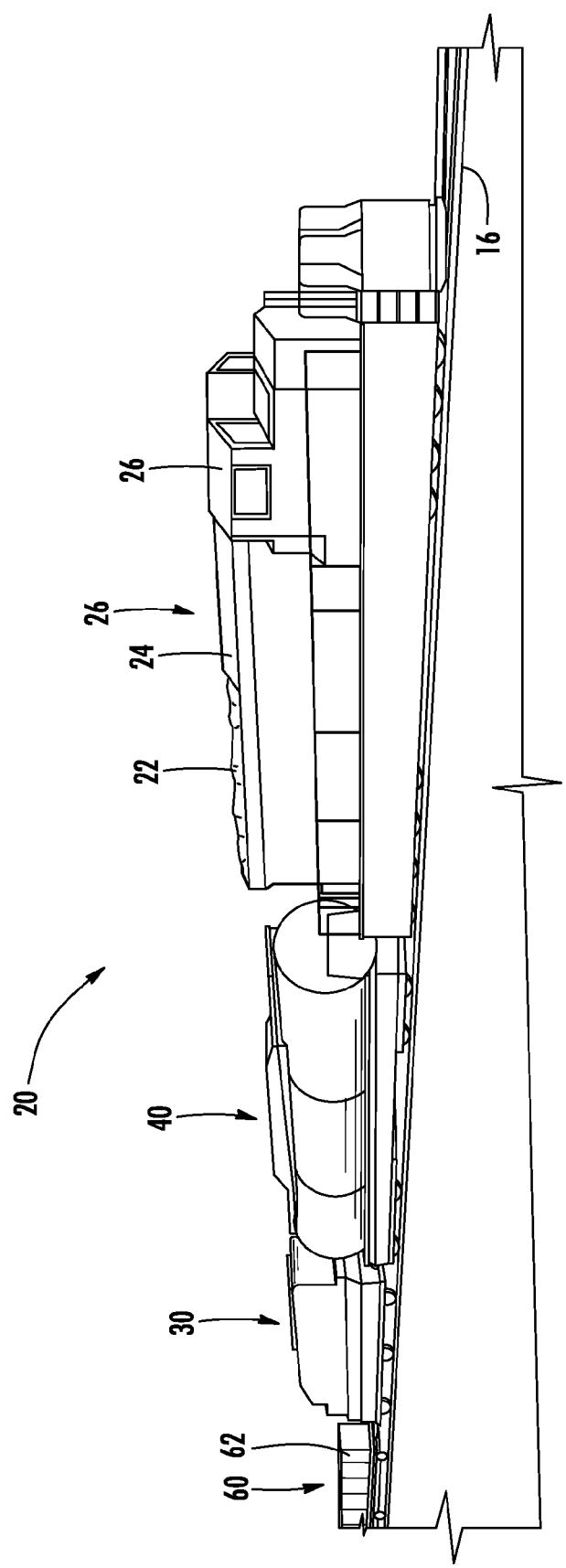
FIG. 2 is a perspective view of a train, including a plurality of train cars, according to one embodiment.

In some embodiments, fuel storage areas 18 may include large dedicated storage tanks (e.g., fuel storage tank 50, etc.) configured to store LNG and trucks 28 may be configured to receive LNG from the dedicated storage tanks Fuel storage areas 18 may also be configured to receive portable cars such as fuel storage cars 40 (shown in FIG. 2). In one embodiment, trains 20 transport fuel storage cars 40 to fuel storage areas 18 and trucks 28 receive LNG from these fuel storage cars 40. In some embodiments, trains 20 include truck-mountable tanks (not shown) configured to detachably mount (i.e., mate) to truck 28 in order for truck 28 to transport LNG.

Referring now to FIG. 2, train 20 is shown, according to one embodiment. In this embodiment, train 20 includes locomotive 42 and a plurality of train cars coupled to locomotive 42. Locomotive 42 provides the motive power for train 20, generating power from fuel (e.g., LNG) within locomotive 42. Further in this embodiment, locomotive 42 includes tender 22 located at the back end of locomotive 42. Tender 22 may contain combustible fuel (e.g., LNG) that is burned to produce energy for powering engine 24, also located within locomotive 42. Locomotive 42 includes cab 26, a compartment from which an operator may control engine 24 in order to move train 20 along a desired route.

In one embodiment, locomotive 42 is powered by natural gas received from fuel production sites 14 and fuel storage areas 18, but in other embodiments, locomotive 42 may be powered by another type of fuel. According to the illustrated embodiment of FIG. 2, fuel storage car 40 is coupled to locomotive 42. In some embodiments, fuel storage car 40 is filled with fuel and transports the fuel to fuel storage areas 18 and train stations 12 on rail map 10. Fuel storage car 40 is removable and may be de-coupled from train 20 for storage at fuel storage area 18, to couple to another train, or for another purpose suitable for the train propellant management system.

In one embodiment, fuel storage car 40 (e.g., tanker car, fuel car, etc.) is filled with LNG at fuel production site 14. LNG has a greater density than gaseous natural gas or compressed natural gas (CNG), having an energy density approximately 2.4 times greater than that of CNG. By using LNG as a source of fuel within the train propellant management system, more energy (in the form of fuel) can be stored within fuel storage car 40, therefore limiting the amount of re-fueling necessary to maintain a sufficient fuel (energy) level within train 20. In some embodiments, fuel storage car 40 includes a heat exchanger (not shown) for converting the LNG back to a gaseous state. In some other embodiments, fuel storage car 40 may carry another form of natural gas, or another type of fuel for fueling locomotives 42 within the train propellant management system.

In one embodiment, fuel storage car 40 is outfitted with a refrigeration system used to maintain the natural gas in a liquid state. In this embodiment, fuel storage car 40 is used to maintain the LNG at a temperature below its condensation point (approximately 111 degrees Kelvin or −162 degrees Celsius at a pressure of one atmosphere) in order to maintain the liquid state of the natural gas. Fuel storage car 40 may have an insulated, double-walled, stainless steel design capable of maintaining a temperature below the condensation point for a specified period of time. For instance, according to the train propellant management system of the present disclosure, fuel storage car 40 may be required to maintain a temperature below the condensation point from the time fuel storage car 40 is de-coupled from a first train at fuel storage area 18, and until the contents of fuel storage car 40 are used as a fuel source by a second train.

In some embodiments, fuel storage car 40 may be used to transport fuel to fuel storage areas 18 that are located on rail map 10. In these embodiments, fuel storage car 40 is filled with LNG at a fuel source (e.g. fuel production site 14, etc.), transported along with a train such as train 20 to another location (e.g. fuel storage area 18, etc.) configured to receive fuel storage car 40, and used as a fuel source for trains other than train 20. For instance, fuel storage car 40 may be de-coupled from train 20 and stationed at fuel storage area 18. Another train may then be routed to fuel storage area 18 as part of the train propellant management system, and the LNG may be pumped from fuel storage car 40 to the other train for use as a source of fuel. Alternatively, fuel storage car 40 may be coupled to the other train at fuel storage area 18. Fuel storage car 40 may then be used to fill the other train with LNG at another point along the other train's specified route. In some embodiments, LNG from fuel storage car 40 is pumped to fuel storage tank 50 located at fuel storage area 18. Fuel storage tank 50 can then be used as a source of fuel for trains routed to fuel storage area 18.

Fuel storage car 40 may also be used to transport fuel to train stations 12 that are in "low traffic" areas of rail map 10 (e.g. train stations 12 without fuel storage areas 18, train stations 12 located along fewer specified train routes, etc.). In this embodiment, trains that travel past fuel production sites 14 or fuel storage areas 18 as part of their route are used to obtain, transport, and deliver fuel to these low-traffic train stations 12. These trains deliver fuel to low-traffic train stations 12 in the context of their regular routes, thus not burning extra fuel, and thus increasing the fuel efficiency of the train propellant management system.

In some embodiments, fuel storage cars 40 are used as part of a system to reduce the average price of fuel for the train propellant management system. In these embodiments, the price of fuel (e.g., LNG) is monitored at more than one location (e.g., fuel production site 14) and the location with the lowest price is determined. Fuel is then purchased from fuel production sites 14, or from other sources having relatively low prices by routing train 20 to the location with the lowest-priced fuel and filling train 20 with the fuel. The fuel is then transported by rail to areas (e.g. fuel storage areas 18, fuel production sites 14, train stations 12, etc.) having higher fuel prices by routing train 20 to these areas. Trains that are located in these high-priced areas can then use the fuel transported from the low-priced areas, and avoid paying the higher fuel prices. In other embodiments, extra fuel may be purchased from fuel production sites 14 or other fuel sources at times when natural gas prices are low, and the extra fuel may then be stored at fuel storage areas 18. When the fuel prices rise to a specified level, the stored, lower-priced fuel is used to avoid paying the extra cost of the higher-priced fuel.

In the illustrated embodiment of FIG. 2, train 20 includes a cryogen container shown as cryogen tank car 30, which may be used for performing thermal ballasting (i.e. application of low-temperature material in order to change the physical state of another material). Cryogen tank car 30 (e.g., removable cryogen tank car) may be coupled to train 20. Cryogen tank car 30 may be filled with a non-natural gas cryogen (e.g., first cryogen, first ballast cryogen), such as liquid nitrogen (LN2) or liquid oxygen (LO2). In some embodiments, train 20 is configured to receive natural gas at the ambient temperature. Once train 20 receives the ambient temperature natural gas into a natural gas tank or other compartment, cryogen tank car 30 uses the cryogen as a heat sink to convert the natural gas to LNG, liquefying the natural gas through thermal ballasting. The resulting LNG can then be used as fuel for locomotive 42 to power train 20, or be transported to other locations.

In some other embodiments, train 20 uses LNG to liquefy a non-natural gas cryogen, such as LN2 and/or LO2, from air. In these embodiments, train 20 uses LNG as a heat sink or cold source, liquefying the nitrogen or oxygen by thermal ballasting. The LN2 and/or LO2 may be contained within an empty cryogen tank car 30. In embodiments in which train 20 does not require the LN2 and/or LO2, train 20 can transport cryogen tank car 30 carrying the non-natural gas cryogen to fuel storage area 18, de-couple train 20 from cryogen tank car 30, and unload cryogen tank car 30 at fuel storage area 18 for another train to use the LN2 and/or LO2 as a cold source. For instance, train 20 may exchange cryogen tank car 30 for a train car filled with LNG fuel, such as fuel storage car 40. In these embodiments, other trains may use cryogen tank car 30 to liquefy natural gas to LNG for the trains to use as fuel. In some embodiments, cryogen tank car 30 may remain coupled to the train, and cryogens may be offloaded from cryogen tank car 30 (e.g., by pumping) into a cryogen storage tank at fuel storage area 18. The cryogen can also be used to liquefy natural gas at fuel storage areas 18, with the LNG being procured by other trains below a specified fuel level (e.g., specified LNG fuel level). Trains may be routed according to rail map 10, and based on the need for cryogen tank cars 30 holding a cryogen and/or for LNG.

Referring further to FIG. 2, flat rail car 60 (i.e. flat car or railroad flat car) is shown coupled to train 20 and holding container 62, according to one embodiment. In this embodiment, the train propellant management system includes flat rail car 60 configured to carry container 62. Flat rail car 60 may be used to carry and transport container 62 filled with fuel (e.g., LNG). In one embodiment, container 62 is coupled to train 20 and transported to fuel storage areas 18. In this embodiment, container 62 may be removed from flat rail car 60 and stored at fuel storage area 18 until a specified time when the fuel within container 62 is needed. For instance, a train within the train propellant management system may be routed to fuel storage area 18 having container 62 when the train requires more fuel. In some embodiments, container 62 is filled with fuel purchased at a relatively low price and stored at fuel storage area 18 until the price of fuel is above a specified price level. In these embodiments, the fuel from container 62 is exhausted to fuel trains within the train propellant management system once the specified price level is exceeded. When the fuel from container 62 is exhausted, container 62 may be loaded on flat rail car 60 and transported to a fuel source in order to be re-filled with fuel.

In some embodiments, container 62 includes a clathrate (i.e., a crystalline water-based solid resembling ice) as part of the train propellant management system. Clathrates include small non-polar gas molecules that are trapped inside hydrogen bonded water molecules. In one embodiment, the non-polar gas molecules are natural gas. The train propellant management system may utilize clathrates to store and transport natural gas for use as a fuel.

In some embodiments, the train propellant management system may use clathrates to sequester combustion carbon dioxide ($CO_2$). In these embodiments, the stored $CO_2$ can be kept in container 62, or in a separate tank car such as fuel storage car 40, and deposited at fuel storage area 18. The stored $CO_2$ may also be removed from fuel storage car 40 and transported into off-board fuel storage area 18. In one embodiment, train 20 may use the same clathrate to store natural gas by removing the $CO_2$ and replacing the $CO_2$ with natural gas. The clathrate including natural gas can then be used to supply another train with fuel. In some embodiments, the $CO_2$ is stored in dry ice. In these embodiments, train 20 may use on-board cryogen to perform the solidification of gaseous $CO_2$ into dry ice. Once removed, $CO_2$ can be deposited at fuel storage area 18 or some other site, depending on the rebate price at a given site, the capacity of train 20, future $CO_2$ generation expectations, or any other considerations suitable for the train propellant management system.

Figure 3:
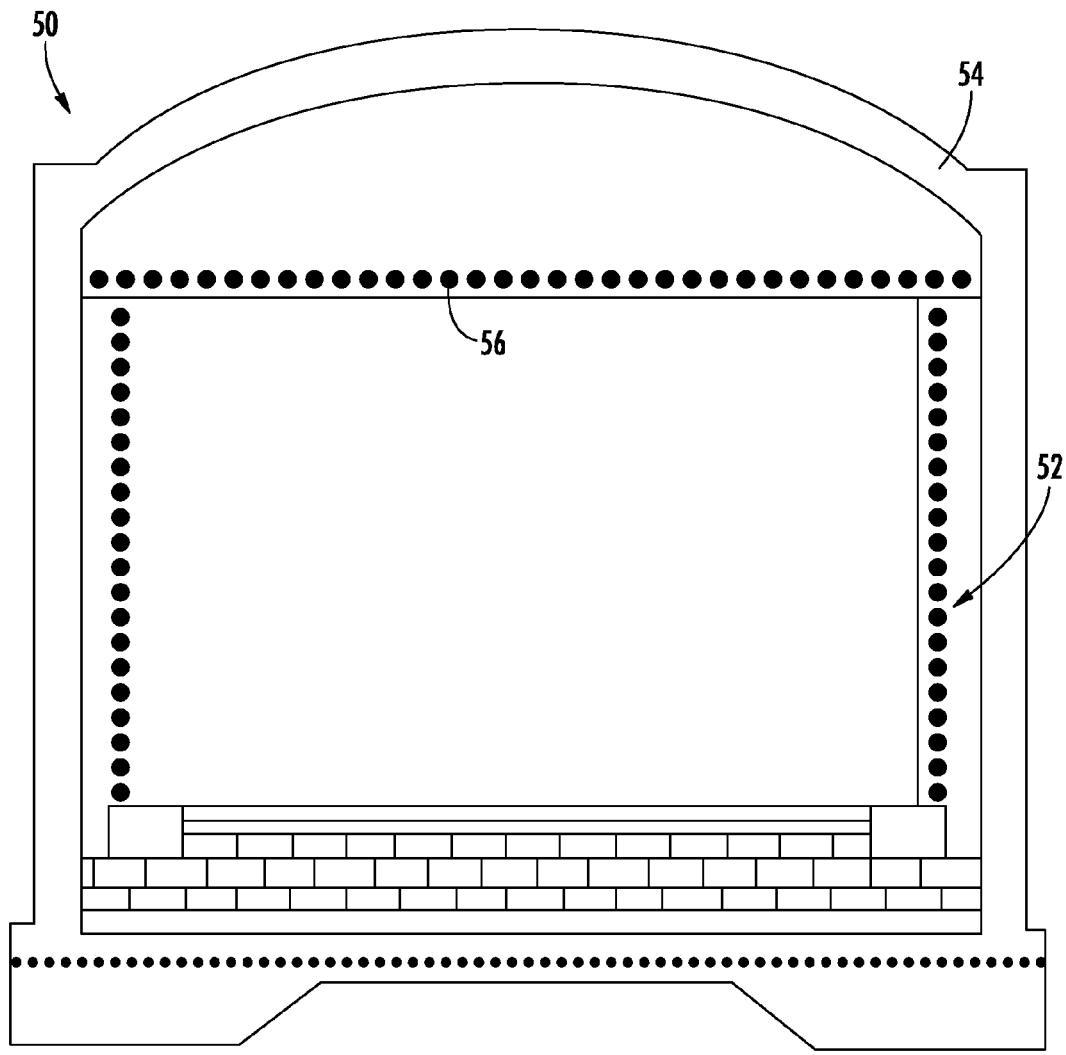
FIG. 3 is a cross-section view of a storage tank for holding liquefied natural gas, according to one embodiment.

Referring now to FIG. 3, fixed fuel storage tank 50 is shown, according to one embodiment. In this embodiment, fuel storage tank 50 is used to store liquefied natural gas. The fuel storage tank is configured to store the LNG at a temperature below the condensation point of natural gas in order to maintain the liquid state of the LNG. In other embodiments, fuel storage tank 50 may include another type of fuel, as is suitable for the particular application of the train propellant management system. In one embodiment, fuel storage tank 50 includes a double fuel storage container (i.e. a storage area and an insulation area). In the illustrated embodiment of FIG. 3, for instance, fuel storage tank 50 includes an inner portion shown as inner container 52. Inner container 52 is configured to contain LNG Inner container 52 includes inner shell 56, which may be made from an insulating material. Fuel storage tank 50 also includes an outer portion shown as outer shell 54, which may also be insulated.

Fuel storage tank 50 may be located at train stations 12, fuel production sites 14, and/or fuel storage areas 18. In some embodiments, trains 20 may obtain LNG from fuel production sites 14 and transport the LNG to fuel storage tanks 50 located at fuel storage areas 18 in order to store the LNG. In these embodiments, the LNG is stored in fuel storage tanks 50 for a specified time, or until a fuel level of train 20 is below a specified level (e.g., specified LNG fuel level, specified fuel level). Once the fuel level is below the specified level, the train propellant management system may dictate that train 20 be routed to fuel storage tank 50 in order to fill train 20 with LNG.

Figure 4:
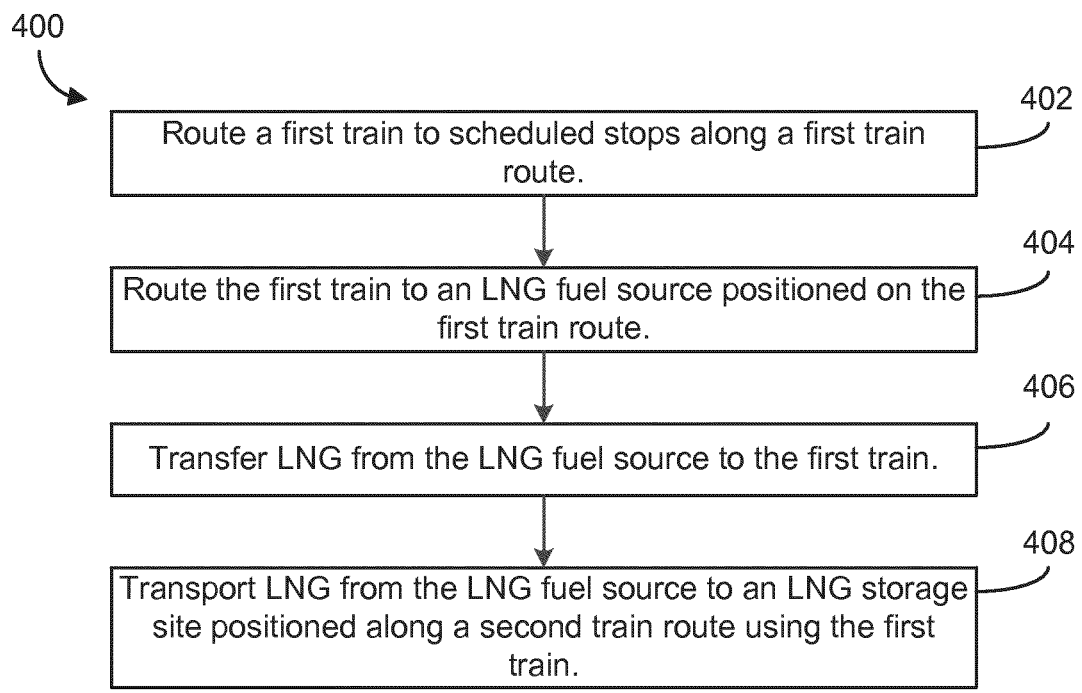
FIG. 4 is a flow chart representation of an LNG storage and delivery method for a transportation system, according to one embodiment.

Referring now to FIG. 4, a flow chart representation 400 of a method for storing and delivering LNG for a train transportation system is shown according to one embodiment. In this embodiment, the method includes routing a first train (e.g., train 20, etc.) to scheduled stops (e.g., train stations 12, etc.) along a first train route at 402, and routing the first train to an LNG fuel source (e.g., fuel production site 14, etc.) positioned on the first train route at 404. The method also includes transferring LNG from the LNG fuel source to the first train at 406, and transporting the LNG (e.g., a supply of natural gas) from the LNG fuel source to an LNG storage site (e.g., fuel storage area 18, etc.) positioned along a second train route using the first train at 408. The LNG storage site may include an LNG storage tank (e.g., fuel storage tank 50). The amount of LNG transported to the LNG storage site may be based on an amount of LNG currently or typically stored at the LNG storage site (i.e., a second amount of LNG), or a storage capacity of the LNG storage site. For instance, the first train may transport a greater amount of LNG to the LNG storage site when the amount of LNG currently stored at the LNG storage site is relatively low, or when the storage capacity of the LNG storage site is relatively high. In some embodiments, natural gas (e.g., a second supply of natural gas) is otherwise received at the LNG storage site, such as from a natural gas pipeline connected to the LNG storage site. In one embodiment, the second supply of natural gas is in gas form, and the LNG storage site includes a natural gas liquefaction facility (e.g., fuel production site 14) for converting the natural gas to LNG. The natural gas may also be liquefied by the first train. In another embodiment, the second supply of natural gas is LNG as delivered to the LNG storage site.

In some embodiments, a second train (e.g., train 20) is routed to scheduled stops along the second train route, including to the LNG storage site so that the second train may be fueled with LNG from the LNG storage site (e.g., LNG delivered by the first train). In one embodiment, the second train route is selected to minimize a distance traveled by the second train. The amount of LNG (i.e., a first amount of LNG) transported to the LNG storage site may be based on fuel requirements of the second train. In one embodiment, the arrival time of the first train to the LNG storage site (i.e., a first train arrival time) is based on a predicted arrival time of the second train (i.e., predicted second train arrival time) to the LNG storage site. In another embodiment, the arrival time of the second train to the LNG storage site (i.e., second train arrival time) is based on an arrival time (i.e., actual or predicted) of the first train at the LNG storage site. In one embodiment, the method includes fueling the second train with the LNG from the LNG storage site less than a specified time (e.g., a fixed time interval) after the first train has delivered the LNG to the LNG storage site. For instance, the specified time may be based on a percentage of LNG that is evaporated before the second train is fueled, or on a price of fuel at the LNG fuel source. In one embodiment, the method includes liquefying natural gas on the second train (i.e., the second train is used to liquefy natural gas), converting the natural gas to LNG.

In one embodiment, the LNG fuel source includes a second LNG storage tank (e.g., fuel storage tank 50). In this embodiment, LNG may be transported to the second LNG storage tank by the first train traveling along the first train route, or by a third train (e.g., train 20) traveling along the first train route. In another embodiment, the LNG is transported to the second LNG storage tank by the third train traveling along a third train route. In this embodiment, the second LNG storage tank is positioned along the third train route.

In one embodiment, the method for storing and delivering LNG for a train transportation system includes providing a first ballast cryogen. The first ballast cryogen may be stored within a cryogen container (e.g., container 62, fuel storage tank 50, cryogen tank car 30, etc.). For instance, the cryogen container may be coupled to one of the trains of the train propellant management system, such as within cryogen tank car 30, or stored (i.e., located) at the LNG storage site, such as within fuel storage tank 50. In one embodiment, the method also includes producing LNG (i.e., a produced LNG) by thermal ballasting using the first ballast cryogen as a heat sink. In one embodiment, the thermal ballasting is performed by the first train. The produced LNG may be stored at the LNG fuel source and/or used to fuel the first train. In one embodiment, the produced LNG is stored along the second train route (e.g., at the LNG storage site) and used to fuel the second train. In another embodiment, the thermal ballasting is performed by the second train and the produced LNG is used to fuel the second train. In this embodiment, the second train may include the cryogen container and the produced LNG may be formed using the first ballast cryogen as a heat sink. In still another embodiment, the produced LNG may be formed by thermal ballasting within fuel storage tank 50 located at the LNG storage site. In one embodiment, the produced LNG is used as a heat sink to produce a second ballast cryogen. In this embodiment, the second ballast cryogen may be the same species of cryogen as the first ballast cryogen (e.g., nitrogen, oxygen, etc.), or the second ballast cryogen may be a different species than the first ballast cryogen.

In one embodiment, the method for storing and delivering LNG for a train transportation system includes monitoring a price of LNG at two or more LNG fuel sources, and determining a lowest-priced LNG fuel source from among the two or more LNG fuel sources (i.e., which of the multiple LNG fuel sources has the lowest-priced LNG). In this embodiment, the first train is then routed to the lowest-priced LNG fuel source in order to transfer LNG to the first train.

Figure 5:
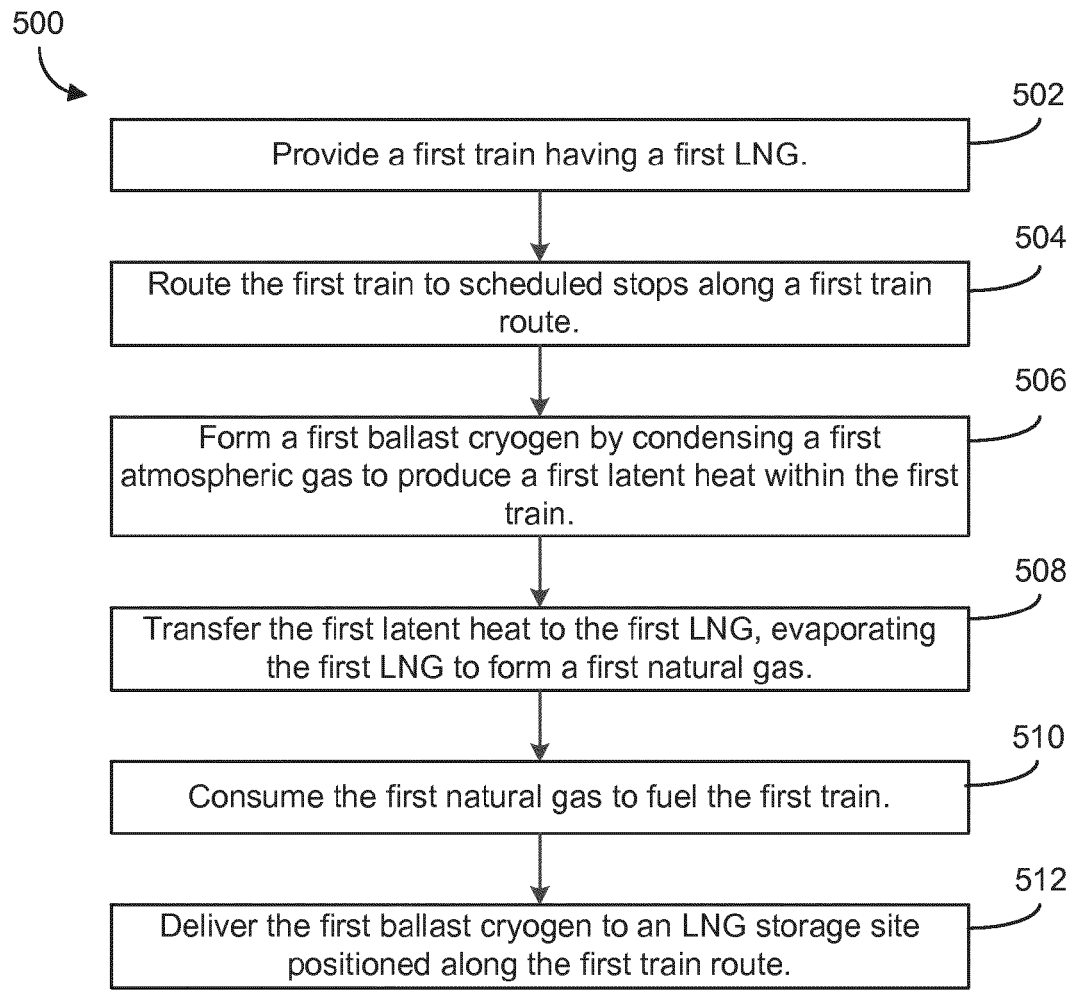
FIG. 5 is a flow chart representation of a thermal ballasting method, according to one embodiment.

Referring now to FIG. 5, a flow chart representation 500 of a thermal ballasting method is shown according to one embodiment. In this embodiment, the method includes providing a first train (e.g., train 20) having a first LNG at 502, routing the first train to scheduled stops along a first train route at 504, and forming a first ballast cryogen (e.g., nitrogen, oxygen, etc.) by condensing a first atmospheric gas (e.g., nitrogen, oxygen, etc.) to produce a first latent heat within the first train at 506. The first train may include an LNG tank (e.g., cryogen tank car 30, fuel storage car 40, fuel storage tank 50). In various embodiments, the first train may be routed based on a cryogen supply of the LNG storage site and/or an LNG supply of the first train. The thermal ballasting method also includes transferring the first latent heat to the first LNG to evaporate the first LNG to form a first natural gas at 508, consuming the first natural gas to fuel the first train at 510, and delivering the first ballast cryogen to an LNG storage site (e.g., fuel storage area 18) positioned along the first train route at 512. The first ballast cryogen may be stored within cryogen tank car 30 coupled to the first train, and delivered to the LNG storage site by cryogen tank car 30. In one embodiment, the first ballast cryogen is delivered to the LNG storage site based on a cryogen level of the first train (i.e., an amount of cryogenic material within the first train). In one embodiment, the first natural gas is at an ambient temperature.

In one embodiment, a first tank (e.g., fuel storage tank 50) is located within the LNG storage site, and the thermal ballasting method includes pumping LNG from the first tank to a second tank (e.g., cryogen tank car 30, fuel storage car 40, container 62, etc.) coupled to the first train. The method may further include pumping the first ballast cryogen from the first train into the first tank. In another embodiment, the thermal ballasting method includes transporting the first ballast cryogen from the first train to the LNG storage site by a first storage tank (e.g., cryogen tank car 30, fuel storage car 40, etc.) coupled to the first train, de-coupling the first storage tank from the first train and positioning the first storage tank within the LNG storage site, and coupling a second storage tank filled with LNG (e.g., cryogen tank car 30, fuel storage car 40, etc.) from the LNG storage site to the first train. In this embodiment, the method may also include liquefying a natural gas located at the LNG storage site by using the first ballast cryogen as a heat sink.

In one embodiment, the LNG storage site is also positioned along a second train route, and the thermal ballasting method includes routing a second train (e.g., train 20) along the second train route. The second train may be routed based on a cryogen supply of the LNG storage site, a cryogen supply of the second train, and/or an LNG supply of the second train. As part of the thermal ballasting method, the second train may be routed to the LNG storage site. In one embodiment, the first ballast cryogen is transferred from the LNG storage site to the second train, and the first natural gas may be liquefied within the second train using the first ballast cryogen as a heat sink. The method may also include liquefying a third natural gas at the LNG storage site using the first ballast cryogen as a heat sink, forming a third LNG. In one embodiment, the second train is fueled by the third LNG. The second train may be fueled when a fuel level of the second train is below a specified LNG level (e.g., specified fuel level), which may be determined or calculated based on the particular application of the train propellant management system.

The thermal ballasting method may also include routing the first train to a natural gas fuel source (e.g., fuel production site 14) positioned along the first train route, transferring a second natural gas from the natural gas fuel source to the first train, forming a second LNG by condensing the second natural gas to produce a second latent heat within the first train, transferring the second latent heat to the first ballast cryogen to evaporate the first ballast cryogen to form a second atmospheric gas (e.g., nitrogen, oxygen, etc.), and venting the second atmospheric gas.

Figure 6:
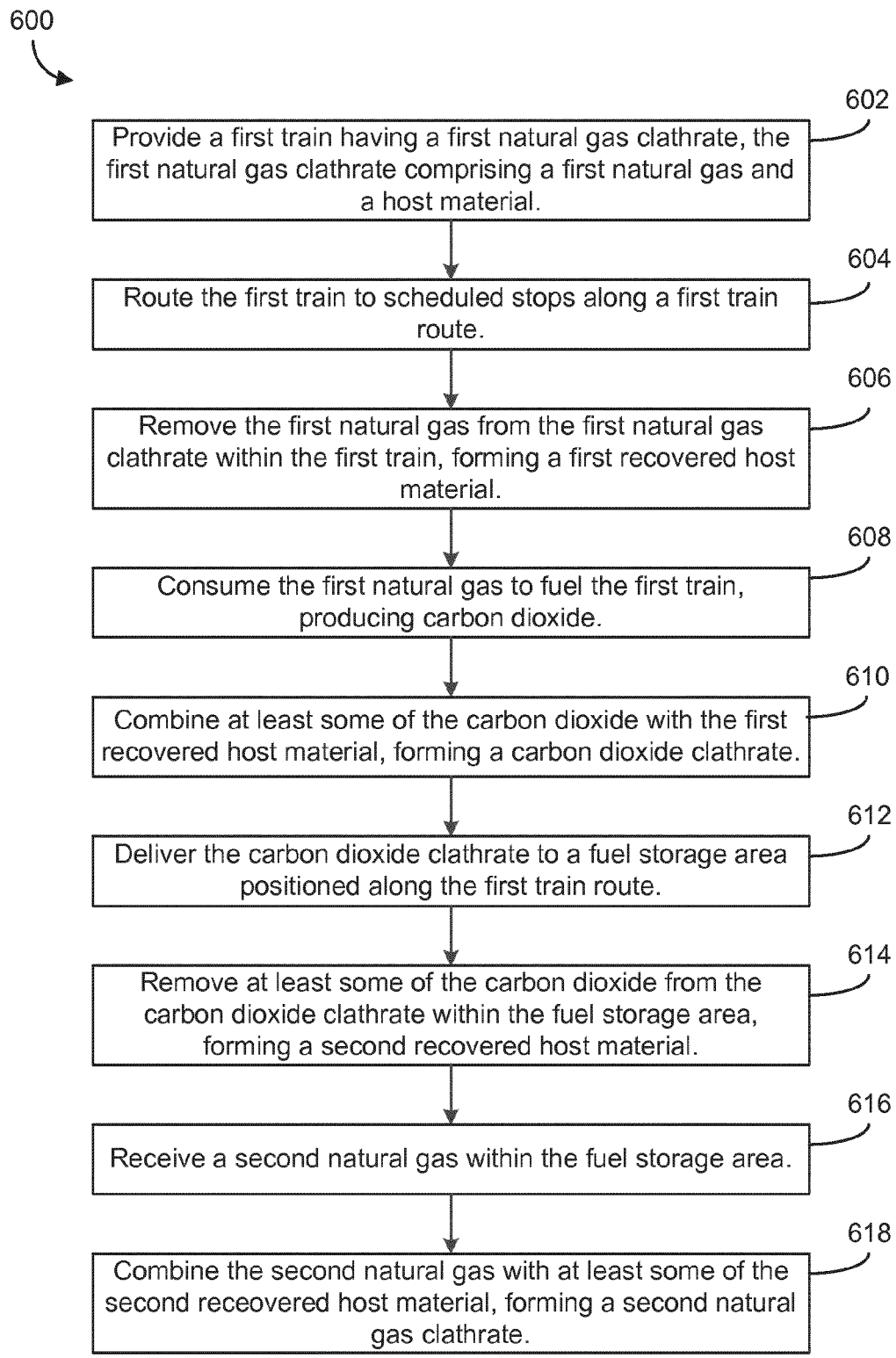
FIG. 6 is a flow chart representation of a propellant management method, according to one embodiment.

Referring now to FIG. 6, a flow chart representation 600 of a propellant management method is shown according to one embodiment. In this embodiment, the method includes providing a first train (e.g., train 20) having a first natural gas clathrate at 602. The first natural gas clathrate may be stored within container 62 on flat rail car 60. The first natural gas clathrate includes a first natural gas and a host material, in this embodiment. The first natural gas clathrate may also include a crystalline water-based solid. The method also includes routing the first train to scheduled stops along a first train route at 604, removing the first natural gas from the first natural gas clathrate within the first train to form a first recovered host material at 606, consuming the first natural gas to fuel the first train to produce carbon dioxide at 608, combining at least some of the carbon dioxide with the first recovered host material to form a carbon dioxide clathrate at 610, delivering the carbon dioxide clathrate to a fuel storage area (e.g., fuel storage area 18) positioned along the first train route at 612, removing at least some of the carbon dioxide from the carbon dioxide clathrate within the fuel storage area to form a second recovered host material at 614, receiving a second natural gas within the fuel storage area at 616, and combining the second natural gas with at least some of the second recovered host material to form a second natural gas clathrate at 618. In one embodiment, the second natural gas is delivered or received by the fuel storage area from a natural gas pipeline. In another embodiment, the second natural gas clathrate includes a crystalline water-based solid.

In one embodiment, the propellant management method further includes routing the first train to the fuel storage area, and supplying the first natural gas clathrate to the first train from the fuel storage area. In another embodiment, the fuel storage area is positioned along the second train route, and the propellant management method includes routing a second train along the second train route, including to the fuel storage area. In this embodiment, the propellant management method also includes supplying the second natural gas clathrate to the second train from the fuel storage area, and may also include removing the second natural gas from the second natural gas clathrate within the second train and consuming the second natural gas to fuel the second train. In another embodiment, the method includes transferring the at least some of the carbon dioxide from the fuel storage area to a carbon dioxide sequestration entity (e.g., fuel storage tank 50).

Figure 7:
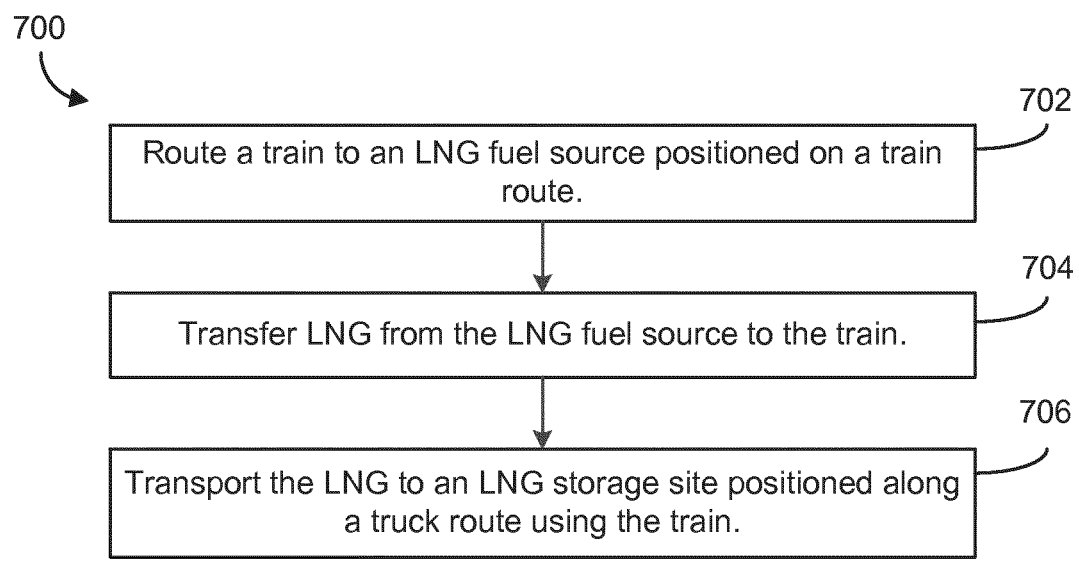
FIG. 7 is a flow chart representation of an LNG delivery method for a transportation system, according to one embodiment.

Referring now to FIG. 7, a flow chart representation 700 of an LNG delivery method for a transportation system is shown according to one embodiment. In this embodiment, the method includes routing a train (e.g., train 20) to an LNG fuel source (e.g., fuel production site 14, etc.) positioned on a train route at 702, transferring LNG from the LNG fuel source to the train at 704, and transporting the LNG to an LNG storage site (e.g., fuel storage area 18, etc.) positioned along a truck route using the train at 706. The method may also include fueling the train with at least a portion of the LNG.

In one embodiment, the method includes routing a truck (e.g., truck 28) to scheduled stops along the truck route, routing the truck to the LNG storage site, and fueling the truck with the LNG from the LNG storage site. In this embodiment, the LNG storage site may be located at an intersection of the train route and the truck route. Further, the truck route may include a highway (e.g., highway 32), and the LNG storage site may be accessible from the highway. In another embodiment, the LNG storage site includes dedicated storage tanks (e.g., fuel storage tank 50) for holding the LNG. In this embodiment, the method includes depositing the LNG to the dedicated storage tanks using the train, and fueling the truck with the LNG from the dedicated storage tanks.

In another embodiment, the method includes routing a truck to scheduled stops along the truck route, and routing the truck to the LNG storage site. In this embodiment, the LNG storage site includes a tanker car (e.g., fuel storage car 40) removable coupled to the train. The method may further include de-coupling the tanker car from the train, positioning the tanker car at the LNG fuel source, and fueling the truck from the tanker car. In another embodiment, the LNG storage site includes a truck-mountable tank (e.g., fuel storage tank 50), with the train transporting the LNG to the LNG storage site within the truck-mountable tank. In this embodiment, the LNG delivery method may include routing a truck to scheduled stops along the truck route (including the LNG storage site), detachably mounting the truck-mountable tank to the truck, and/or fueling the truck from the LNG within the truck-mountable tank. In another embodiment, the method includes filling the truck-mountable tank with LNG from the train, detachably mounting the truck-mountable tank to the truck, and fueling the truck from the LNG within the truck-mountable tank.

The construction and arrangement of the apparatus, systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the described embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. Such joining may be communicative, rather than physical.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An LNG storage and delivery method for a transportation system, the method comprising:
   routing a first train to scheduled stops along a first train route, the scheduled stops of the first train route including an LNG fuel source positioned on the first train route;
   transferring a first amount of LNG from the LNG fuel source to the first train;
   transporting a second amount of LNG from the first amount of LNG to an LNG storage site using the first train, wherein the second amount is determined based solely on fuel requirements of a second train, and, wherein the LNG storage site is positioned along both the first train route and a second train route;
   routing the second train to scheduled stops along the second train route, the scheduled stops of the second train route including the LNG storage site positioned along the first and second train routes; and
   fueling the second train from the second amount of LNG at the LNG storage site.

2. The method of claim 1, further comprising:
   scheduling an arrival time of the first train at the LNG storage site based on a predicted arrival time of the second train at the LNG storage site.

3. The method of claim 1, further comprising:
   scheduling an arrival time of the second train at the LNG storage site based on an arrival time of the first train at the LNG storage site.

4. The method of claim 1, wherein the LNG storage site is positioned at an intersection of the first and second train routes.

5. The method of claim 1, wherein the second train is fueled with the LNG from the LNG storage site less than a specified time after the first train has delivered the LNG to the LNG storage site.

6. The method of claim 5, wherein the specified time is based on a percentage of LNG evaporated before the second train is fueled.

7. The method of claim 1, wherein the LNG storage site includes an LNG storage tank, and wherein the first train delivers the transported LNG to the LNG storage tank.

8. The method of claim 7, wherein the LNG storage tank is positioned along a third train route, and further comprising:
   transporting LNG to the LNG storage tank using a third train traveling along the third train route.

9. The method of claim 1, further comprising:
   selecting the second amount of LNG transported to the LNG storage site based on a storage capacity of the LNG storage site.

10. The method of claim 1, further comprising:
    fueling the first train with LNG from the LNG fuel source; and
    maintaining a specified LNG fuel level within the first train.

11. The method of claim 1, further comprising:
    monitoring a price of LNG at two or more LNG fuel sources; and
    determining a lowest-priced LNG fuel source from among the two or more LNG fuel sources;
    wherein the first train is routed to the lowest-priced LNG fuel source in order to transfer LNG to the first train.

12. The method of claim 11, further comprising:
    selecting the LNG fuel source according to geographic variations in the price of LNG.

13. The method of claim 11, further comprising:
    selecting the LNG storage site according to geographic variations in the price of LNG.

14. The method of claim 1, wherein the first train includes a removable fuel storage tank for carrying LNG, and wherein the LNG is transferred to the first train by filling the fuel storage tank with LNG from the fuel source.

15. The method of claim 14, wherein the LNG is transported to the LNG storage site by:
    transporting the fuel storage tank to the LNG storage site;
    removing the fuel storage tank from the first train; and
    stationing the fuel storage tank at the LNG storage site.

16. The method of claim 15, further comprising:
    coupling the fuel storage tank to the second train at the LNG storage site.

17. The method of claim 15, further comprising:
    fueling the second train with the LNG from the fuel storage tank.

18. The method of claim 1, further comprising:
    positioning the LNG storage site based on proximity to LNG resources.

19. The method of claim 1, further comprising:
    routing a truck to scheduled stops along a truck route;
    routing the truck to the LNG storage site; and
    fueling the truck with LNG from the LNG storage site.

* * * * *